Dec. 8, 1936.  C. H. WILLIS  2,063,648
ELECTRIC VALVE RECTIFYING SYSTEM
Filed Nov. 15, 1933
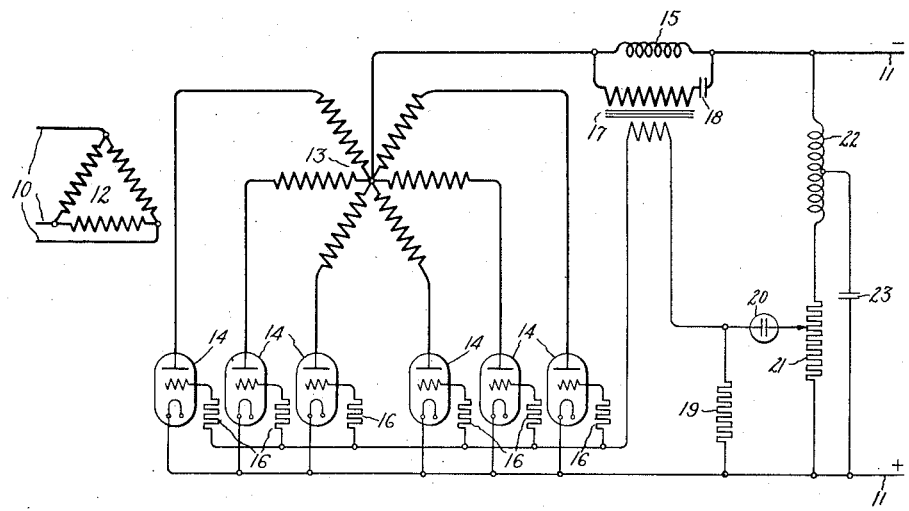
Inventor:
Clodius H. Willis,
by Harry E. Dunham
His Attorney.

UNITED STATES PATENT OFFICE 2,063,648

ELECTRIC VALVE RECTIFYING SYSTEM

Clodius H. Willis, Princeton, N. J., assignor to General Electric Company, a corporation of New York Application November 15, 1933, Serial No. 698,118

7 Claims. (Cl. 175—363)

My invention relates to electric valve rectifying systems and more particularly to the control or regulation of such rectifying systems.

Heretofore there have been proposed numerous control or regulating systems for electric valve rectifiers, in which the control or regulation was effected by applying to the control electrodes of the electric valves alternating potentials variable in phase with respect to the anode potentials of the valves, or unidirectional bias potentials variable in magnitude, or a combination of the two. Many of the arrangements of the prior art have involved considerable complexity and have, at the same time, fallen short of the desired accuracy of regulation. My invention relates to a new and improved regulating system for an electric valve rectifier of superior simplicity and accuracy.

It is an object of my invention therefore to provide a new and improved regulating and control system for electric valve rectifiers which will overcome the above mentioned shortcomings of the arrangements of the prior art, and which will be simple and reliable in operation.

It is another object of my invention to provide a new and improved regulating and control system for electric valve rectifiers which will require a minimum of regulating apparatus and which will regulate to any desired degree of accuracy.

In accordance with one embodiment of my invention, an electric valve rectifying system including an alternating current transformer network and a plurality of electric valves is provided with a reactance device interposed in the connections from the network to one side of the direct current circuit. A control circuit is provided for the electric valves including means for deriving a potential from said reactance device, as for example, a control transformer having its primary winding connected across the reactance device. The control circuit also includes a source of control potential which may be varied manually or automatically to control or regulate the output of the rectifier. In accordance with another feature of my invention, automatic regulation is effected by providing a plurality of impedance devices connected across the direct current circuit of the rectifier and including a constant voltage element, such as a glow lamp. Means are provided for introducing into the control circuits of the electric valves the difference voltage between that of the direct current circuit and that of the constant voltage element.

For a better understanding of my invention, together with other and further objects thereof, reference is had to the following description taken in connection with the accompanying drawing, and its scope will be pointed out in the appended claims. The single figure of the drawing diagrammatically illustrates an embodiment of my invention as applied to the regulation of a rectifying system for transmitting energy from a three-phase alternating current supply circuit to a direct current load circuit.

Referring now more particularly to the single figure of the drawing, there is diagrammatically illustrated an arrangement for transmitting energy from a three-phase alternating current supply circuit 10 to a direct current load circuit 11. This apparatus includes a transformer comprising a three-phase network 12 connected to the supply circuit 10 and a six-phase secondary network 13. The several phase terminals of the network 13 are connected to the positive side of the direct current circuit 11 through electric valves 14, while its electrical neutral is connected to the negative side of the direct current circuit through a current smoothing reactor 15. Electric valves 14 may be of any of the several types well known in the art, although I prefer to use valves of the vapor electric discharge type. The electric valves 14 may comprise a plurality of single-anode, single-cathode devices, each provided with a control electrode, or grid, as illustrated, or they may be assembled into a single multiple-anode, single-cathode discharge device with a plurality of control electrodes, one for each anode, which it is understood, are well known equivalents.

In order to control or regulate the amount of energy transmitted by the rectifying apparatus, the control electrodes, or grids, of the electric valves 14 are connected to their common cathode circuit through current limiting resistors 16 and the secondary winding of a control transformer 17, the primary winding of which is connected across the smoothing reactor 15 through a blocking capacitor 18. A resistor 19, across which is produced the desired control or regulating potential, is also included in the common portion of the control circuits. The potential appearing across the resistor 19 may be produced by any suitable source of unidirectional current variable in magnitude, or, as illustrated in the drawing, this resistor may comprise a part of a regulating system. In the embodiment illustrated, the resistor 19 is connected in series with an element having a constant voltage element thereacross, such as a glow tube 20, across an adjustable portion of a potentiometer 21 which is energized from the direct current circuit 11 through a filter circuit which may comprise a mid-tapped reactor 22 and a capacitor 23.

The general principles of operation of the above described apparatus will be well understood by those skilled in the art. If the grid control circuit be neglected, it will be seen that the power circuit comprises a six-phase half wave rectifier of conventional connection with a smoothing reactor 15 included in the direct current circuit to maintain the direct current substantially constant. In maintaining the unidirectional current constant the smoothing reactor 15 alternately absorbs and releases the difference between the instantaneous potential of the particular phase winding of the network 13 which is active, and the potential of the unidirectional current circuit 11. In the illustrated embodiment, this alternating potential across the reactor 15 has a frequency which is the sixth harmonic of the frequency of the supply circuit 10, or in general, the frequency across such a reactor will be $n$ times that of the supply frequency where $n$ is the number of phases of the rectifier network. In this case, with a sixth harmonic of potential, a positive half cycle will occur each 60 electrical degrees as referred to in the supply circuit. Also it will be noted that with six electric valves, one must be rendered conductive each 60 electrical degrees. The positive impulses of this sixth harmonic potential may be timed to excite the control electrodes, or grids, of all of the electric valves, and only that valve will conduct current which is connected to the phase winding of the most positive electromotive force.

By superimposing a unidirectional control potential in the control circuit, as derived from the resistor 19, the point in the cycle of the harmonic potential at which the resultant control potential becomes positive or exceeds the critical control potential of the electric valves, may be readily adjusted to vary the effective phase relation between the grid and anode potentials of the electric valves, and thus the average voltage impressed upon the circuit 11, in a well known manner.

In the particular regulating system illustrated, the filter circuit comprising the reactor 22 and the capacitor 23 serves to substantially absorb any fluctuations in the unidirectional voltage which may pass the smoothing reactor 15, and to impress the average unidirectional potential of the rectifier on the potentiometer 21. The characteristics of the glow lamp 20 are such that its terminal potential remains constant to an exceedingly accurate degree, as is well known in the art, and the difference voltage between that appearing across the lower portion of the potentiometer 21 and that across the terminals of the glow lamp 20 appears across the resistor 19 and is effective to vary the effective phase angle of the harmonic potentials impressed upon the grids of the electric valves 14, and thus vary the average output of the rectifying apparatus as described above. For example, if the voltage of the direct current circuit 11 tends to fall, due to an increase in load or other cause, the difference voltage appearing across the resistor 19 will decrease by a larger percentage than that of the circuit 11. This amplified variation is effective to advance the effective phase of the excitation to the grids of the electric valves 14 and increase the average voltage impressed upon the circuit 11 to compensate for the changed condition. Obviously, upon a rise in voltage on the load circuit 11 the reverse process will take place. By properly adjusting the potentiometer 21 so that the voltage across the lower portion of the potentiometer approximates that constant voltage across the terminals of the glow lamp 20, the variations in the voltage on the supply circuit 11 may be very greatly amplified to produce very accurate regulation.

While I have illustrated my invention as applied to a six-phase half wave rectifying system, it will be well understood by those skilled in the art that it is equally applicable to rectifying systems of any number of phases, and not only to single secondary rectifying systems, such as that illustrated in the drawing, but to multiple secondary systems, such as double three-phase, triple single-phase and other well known rectifier circuits. In this latter case, the harmonic voltages may be obtained from the interphase reactors, which act as combined smoothing reactors and equalizing reactors.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In an electric valve rectifying system including an alternating current supply circuit, a direct current load circuit, a transformer network, a plurality of controlled electric valves interconnecting said circuits through said network, and means interposed in the connections to said direct current circuit for deriving an alternating potential from said direct current circuit, a control circuit for said valves including a source of unidirectional control potential and a component of alternating voltage derived from said first mentioned means.

2. In an electric valve rectifying system including an alternating current supply circuit, a direct current load circuit, a transformer network, a plurality of controlled electric valves interconnecting said circuits through said network, and a reactance device interposed in the connections to said direct current circuit, a control circuit for said valves including a source of control potential and a control transformer energized with the potential across said reactance device.

3. An electric valve rectifying system comprising a transformer network for energization from an alternating current circuit, said network being provided with an electrical neutral, a direct current load circuit, a plurality of electric valves interconnecting the several terminals of said network with one side of said direct current circuit, each of said valves being provided with a control electrode, a reactance device interconnecting the other side of said direct current circuit and the neutral of said network, and a control circuit for said control electrodes including a source of unidirectional control potential and means for deriving an alternating potential from said reactance device.

4. An electric valve rectifying system comprising a transformer network for energization from an alternating current circuit, said network being provided with an electrical neutral, a direct current load circuit, a plurality of electric valves each provided with an anode, a cathode, and a control electrode, the anodes of said valves being connected to the terminals of said network and the cathodes to one side of said direct current circuit, a reactance device interconnecting the other side of said direct current circuit and the neutral of said network, a control circuit connecting the control electrodes of said valves to their common cathode circuit, and a control transformer having a primary winding energized from the potential across said reactance device and a secondary winding, said control circuit including said secondary winding and a source of unidirectional bias potential.

5. A regulating system for an electric valve rectifier including a direct current circuit, a transformer network, and a plurality of controlled electric valves interconnecting said network and said direct current circuit, comprising a control circuit for said valves including a source of periodic potential derived from said direct current circuit, a circuit including an element having a constant voltage component thereacross for connection across said direct current circuit, and means for energizing said control circuit with the difference voltage between said direct current circuit and said element having a constant voltage component thereacross.

6. A regulating system for an electric valve rectifier including a direct current circuit, a transformer network and a plurality of controlled electric valves interconnecting said network and said direct current circuit, a control circuit for said valves including a source of periodic potential derived from said direct current circuit, and an impedance element, a device having a constant voltage component thereacross serially connected with said impedance element for energization from said direct current circuit, filter means for preventing ripple pulsations from affecting said impedance element, said impedance element introducing into said control circuit a direct current potential.

7. In combination, an alternating current supply circuit, a direct current load circuit, rectifier apparatus interconnecting said circuits comprising a transformer network provided with an electrical neutral, a plurality of controlled electric valves connecting the terminals of said network to one side of said direct current circuit, a reactance device connecting said electrical neutral to the other side of said direct current circuit, a circuit including a device having a constant voltage component thereacross connected across said direct current circuit, and a control circuit for said valves including means for deriving a potential from said reactance device and means for introducing into said control circuit the difference voltage between said direct current circuit and said device having a constant voltage thereacross.

CLODIUS H. WILLIS.